Patented July 7, 1953

2,644,782

UNITED STATES PATENT OFFICE 2,644,782

AUREOMYCIN FOR INJECTION

Ben King Harned and Raymond Wesley Cunningham, Pearl River, N. Y., assignors to American Cyanamid Company, New York, N. Y., a corporation of Maine No Drawing. Application September 8, 1949, Serial No. 114,686

6 Claims. (Cl. 167—65)

Our invention relates to methods of preparation and products having therein aureomycin in a therapeutically effective form in which the acidity is modified by the action of a buffer system so that the material in its final form is more suitable for parenteral administration. The invention concerns the package containing the components, the method of admixture and the injectable product.

Aureomycin is a new drug produced by the fermentation of Streptomyces aureofaciens which is more particularly described and set forth in a co-pending application of Benjamin M. Duggar, Serial Number 7,592 filed February 11, 1948, now Patent Number 2,482,055 dated September 13, 1949.

Aureomycin has been found to be a naphthacene derivative and while having a structure which strongly suggests tautomeric forms, is believed to exist with the following probable structure:

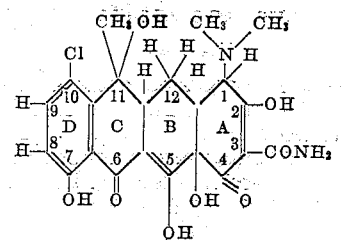

A numbering system is shown for the molecule. One proper name for the compound is 1-dimethylamino -4,6 - dioxo - 10 - chloro - 11-methyl - 2,4a,5,7,11 - pentahydroxy - 1,4,4a,6,11, 11a,12,12a - octahydronaphthacene - 3 - carboxamide. A generic term for the compound is chlorotetracycline, which is consistent with the name oxytetracycline for terramycin as suggested in the Journal of the American Chemical Society, 74:4976 (1952).

Aureomycin is an amphoteric material which can exist as an uncombined material, or as acid salts, or as salts with various cations. Aureomycin is more stable in aqueous solutions at the lower pH's and is most commonly commercialized in the form of the hydrochloride salt. Aureomycin may be administered orally. For some therapeutic purposes, such as moribund patients and those with gastro-intestinal disturbances, the oral route of administration is not as satisfactory as could be desired. Accordingly a preparation of aureomycin at a pH within the range of 7 to 9, which is most satisfactory for parenteral use, particularly intravenous, is greatly to be desired. Human blood has a pH of about 7.3 to 7.5 and a preparation as close to this range as can be obtained is preferred. Aureomycin hydrochloride can be titrated to within this pH range but the product is comparatively unstable; the titration is very critical; it is hard to handle; and it is difficult to obtain a product whose pH does not exhibit a tendency to drift. By our invention we have found that if to a preparation of aureomycin, particularly the acid salts and conveniently the hydrochloride, as this is the form in which it is most readily obtained, there be added an amino acid buffer system such as an amino acid, an amino acid amide, a dipeptide or a tri-peptide converted into a suitable buffer system by at least the partial neutralization of the free carboxyls with a base, there is provided a buffer which upon the admixture with the proper amount of aureomycin hydrochloride will produce a solution of aureomycin with a stable pH in the range of 7 to 9. Unfortunately the material is not time stable as so constituted and the article of commerce must therefore necessarily consist of the aureomycin, preferably as its acid salt, such as the hydrochloride, and the buffer solution, such as the solution of leucine, glycine, etc., at least partially neutralized by a base, preferably both prepared under sterile conditions, so that by the simple admixture of the buffer solution to the aureomycin there is immediately obtained a solution satisfactory for therapeutic use. It is convenient to use an aureomycin hydrochloride preparation which has been dehydrated while frozen so that the aureomycin is in a suitable condition of subdivision whereby upon the admixture of the buffer solution immediate solution occurs, but any finely divided aureomycin acid salt may be used. When a diluent as provided within the scope of our invention is used, an adequate dose of aureomycin may be dissolved in a conveniently small volume whereby a therapeutically effective dose may be rapidly and conveniently injected in a desirably small quantity of solution. The solution is clear and highly satisfactory from all therapeutic considerations. If an inadequate amount of the diluent is added, an insoluble precipitate may form, which remains insoluble even with additional diluent. If the required volume is promptly added, no precipitate forms.

The aureomycin utilized may be in the form of either the free aureomycin or as an acid salt. The acid salts are more storage stable and are more conveniently prepared and accordingly will normally be used. The hydrochloride salt is eminently satisfactory because the chloride ion has no deleterious side effects under normal conditions and the hydrochloride is an easily characterized, stable, convenient starting material. As buffers there may be used any of some several amino acids with an acid dissociation constant between about $4 \times 10^{-10}$ and about $1 \times 10^{-8}$. Included among these are glutamic acid, asparagine, hydroxyproline, leucine, glycine, norleucine, isoglutamine and proline. The more soluble of these permit the higher concentrations of aureomycin.

For purposes of computing the therapeutic dose it is the present practice to consider aureomycin in terms of its hydrochloride, and where concentrations are hereafter mentioned, it is to be understood that it is on the basis of sufficient aureomycin to be therapeutically equivalent to the given quantity of aureomycin as its hydrochloride per volume of solution. For human use it is convenient that the aureomycin be present to between ½% and 5% calculated as the aureomycin hydrochloride. Higher concentrations are obtainable but are normally not considered as therapeutically desirable by the average practitioner. It is desirable that the pH of the constituted solution be close to the range of 7 to 9. The alkalinity of the buffer system may be adjusted so that upon constitution of the parenteral material, it will have a pH within this range. Above a pH of 9, the aureomycin decomposes too rapidly to be sufficiently stable for convenient therapeutic use.

Whereas it may be convenient to use a metallic salt of one of the amino acids, it is frequently more convenient to use a partially neutralized amino acid as the buffer. The base involved correspondingly may be sodium hydroxide, potassium hydroxide, etc. but in view of the innocuous characteristics of the sodium ions, it is normally more convenient to use the sodium salt rather than one of the other metallic salts. The potassium ion of course, has its own therapeutic effect. If all of the free carboxyl groups on the amino acid are completely neutralized, a more alkaline product results than if only partial neutralization occurs, but under normal conditions it is frequently convenient to use a partially neutralized amino acid whereby a larger quantity of the amino acids are present which of course exert a stabilizing influence on the solution and more buffer action may be obtained, giving a system more resistant to a shift in the pH.

The solubility of the amino acids themselves vary and some of the amino acids are not sufficiently soluble to singly give the desired effect. In such instances a mixture of two or more of the amino acids may be used to obtain a system having sufficient buffer and solubilizing activity while still within the solubility ranges of all of the components. The choice of the amino acid is not particularly critical from the theoretical standpoint, but from the economic standpoint glycine appears to be a particularly desirable material. Glycine has not only a low molecular weight but is readily obtainable and is reasonably priced. Mixtures of some of the others, that is a group of amino acids which may include di-peptides and tri-peptides and which while pure enough for drug use, has not been separated into the individual components, are frequently found to be available at a lower cost than are the single amino acids themselves and may be used. The following examples show certain specific embodiments of our invention but are not to be taken as limiting its scope, but on the contrary as certain preferred embodiments which exhibit the therapeutic advantages above mentioned.

Example 1

A liter of 0.2 molar l(-)-leucine as a partial sodium salt was prepared by making up to a liter of solution 26.23 grams of leucine and 77 milliliters of 1.0 N sodium hydroxide, thereby obtaining a solution with a pH of 9.48. To this solution was added 20 grams of aureomycin as the hydrochloride, thereby obtaining a solution with a final pH of 7.8. The buffer was sterilized by heating to 100° C. for 90 minutes before the addition of the aureomycin, although this is not always necessary. The clear final solution of aureomycin is suitable for injection into a patient, preferably intravenously.

The exact final pH may vary slightly with different lots of aureomycin hydrochloride, particularly if only commercially pure aureomycin hydrochloride is used.

Example 2

A solution of asparagine in water containing 0.09 mole per liter had added thereto sodium hydroxide until the pH reached 8.93. To 1 cc. of this solution was added 10 milligrams of aureomycin hydrochloride, thereby yielding a clear solution with a pH of 7.75 and containing 1% of aureomycin, calculated as the hydrochloride.

Example 3

The above experiment was repeated using an asparagine solution containing 0.18 mole per liter of asparagine. The pH was raised to 8.90 with sodium hydroxide. 20 milligrams of aureomycin hydrochloride were dissolved in 1 cc. thereof yielding a clear solution with a pH of 7.92.

Example 4

Example 2 was repeated using an asparagine solution containing 0.27 mole per liter of asparagine. The pH was raised to 8.90 with sodium hydroxide. 30 milligrams of aureomycin hydrochloride were dissolved in 1 cc. thereof yielding a clear solution with a pH of 7.72.

Example 5

Example 2 was repeated using an asparagine solution containing 0.36 mole per liter of asparagine. The pH was raised to 8.93 with sodium hydroxide. 40 milligrams of aureomycin hydrochloride were dissolved in 1 cc. thereof yielding a clear solution with a pH of 7.69.

Examples 6 to 9

The above series was repeated using an asparagine solution which had an original pH of 8.90 and which was heated for 90 minutes at 100° C. to insure sterility.

| Example | Molarity | pH After Sterilization | Percent Aureomycin Hydrochloride | Final pH |
|---|---|---|---|---|
| 6 | 0.09 | 8.89 | 1 | 8.02 |
| 7 | 0.18 | 8.89 | 2 | 7.93 |
| 8 | 0.27 | 8.90 | 3 | 7.98 |
| 9 | 0.36 | 8.90 | 4 | 7.98 |

Example 10

10 cc. of a 0.1 molar solution of asparagine had added thereto sodium hydroxide to raise the pH to 9.09. Thereto was added 200 milligrams of aureomycin hydrochloride resulting in a clear solution with a pH of 7.25.

Example 11

A 0.2 molar solution of glycine was prepared and the pH raised to 9.48 by the addition of sodium hydroxide as a 1 N solution, then passed through a sterile filter. Thereto was added 200 milligrams of aureomycin hydrochloride, resulting in a solution with a pH of approximately 8.

The solution was satisfactory for parenteral injection, preferably intravenously.

Example 12

10 cc. of a solution 0.2 molar in leucine with a pH of 9.48 was prepared by the addition of potassium hydroxide to a solution of leucine and to this solution was added 200 milligrams of aureomycin as the hydrochloride, resulting in a solution satisfactory for parenteral use, preferably intravenous, in those instances where the potassium ion present does not have a deleterious effect upon the particular subject.

Example 13

468 milligrams of asparagine was made up to a volume of 10 milliliters and a pH of 8.90 in water with the use of 1 N sodium hydroxide. To this solution was added 400 milligrams of aureomycin hydrochloride resulting in a final pH of approximately 7.8. The preparation was carried out under sterile conditions and the final product was a clear solution, slightly yellowish, suitable for use as a therapeutic dose of aureomycin hydrochloride. The concentration of aureomycin as the hydrochloride was approximately 4%. 400 milligrams is a large therapeutic dose for an average patient and while the concentration is higher than preferred by many practitioners, it is found to be eminently satisfactory therapeutically.

Example 14

20 cc. of a solution 0.18 molar with asparagine raised to a pH of 8.93 with sodium hydroxide was added to 400 milligrams of aureomycin hydrochloride yielding a solution with a final pH of approximately 7.8. The preparation was carried out sterilely, resulting in a clear 2% solution of aureomycin, which is a concentration frequently preferred for intravenous injection into a patient. 400 milligrams is a larger dose than may be needed, but for immediate therapeutic response, it is found to be extremely satisfactory.

Example 15

100 milligrams of aureomycin hydrochloride dissolved in water was placed in a 20 cc. vial, frozen and the water removed by sublimation. A second vial of solution was prepared containing 2.6% by weight of 1(-)-leucine alkalinized to a pH of 8.9 with sodium hydroxide. This solution was filled into a 20 cc. vial, stoppered and sterilized. The two vials were found to be storage stable, could be kept without refrigeration, and were capable of standing without loss of potency or other side effect for periods of at least several months. For injection the contents of the leucine solution vial were sterilely transferred to the dry aureomycin hydrdochloride which instantly dissolved therein, resulting in a sterile solution suitable for intravenous injection into a patient.

The solutions as prepared should be rather promptly used because as much as 10% of the activity of aureomycin may be destroyed in 30 minutes at room temperature at these pH's, even in the presence of our buffers. If the pH rises above 9, the aureomycin is inactivated too rapidly for convenient administration; if below 7, it may become insoluble. The buffer must have sufficient capacity to convert the final product to within the range.

As our invention we claim:

1. A stablized solution of aureomycin comprising a non-toxic intravenously acceptable acid salt of aureomycin dissolved in an amino acid buffer solution, the amino acid having an acid dissociation constant between about $4 \times 10^{-10}$ and $1 \times 10^{-8}$, said stabilized solution having a pH between about 7 and 9.

2. A non-toxic intravenously acceptable therapeutically effective solution of aureomycin comprising aureomycin as its hydrochloride dissolved in an aqueous solution of amino acids at least partially neutralized with an alkali metal hydroxide, said amino acids having an acid dissociation constant between about $4 \times 10^{-10}$ and $1 \times 10^{-8}$, said therapeutically effective solution having a pH between about 7 and 9.

3. A liquid composition for intravenous injection containing as essential ingredients approximately 100 milligrams of aureomycin hydrochloride dissolved in about 10 cc. of water containing approximately 2.6% 1(-)-leucine raised to a pH of about 8.9 with sodium hydroxide.

4. A non-toxic intravenously acceptable therapeutically effective solution of aureomycin comprising aureomycin hydrochloride dissolved in a buffer solution comprising at least one amino acid at least partially neutralized with an alkali metal hydroxide to such a pH that the final product shall have a pH of between 7 and 9, the amino acid having an acid dissociation constant between about $4 \times 10^{-10}$ and $1 \times 10^{-8}$.

5. A non-toxic intravenously acceptable therapeutically effective solution of aureomycin comprising aureomycin as its hydrochloride dissolved in an aqueous solution of glycine at least partially neutralized with an alkali metal hydroxide, said therapeutically effective solution having a pH between about 7 and 9.

6. A non-toxic intravenously acceptable therapeutically effective solution of aureomycin comprising aureomycin as its hydrochloride dissolved in an aqueous solution of asparagine at least partially neutralized with an alkali metal hydroxide, said therapeutically effective solution having a pH of between about 7 and 9.

BEN KING HARNED.
RAYMOND WESLEY CUNNINGHAM.

References Cited in the file of this patent

UNITED STATES PATENTS

| Number | Name | Date |
|---|---|---|
| 2,275,809 | Roberts | Mar. 10, 1942 |
| 2,343,625 | Abramson | Mar. 7, 1944 |
| 2,482,055 | Duggar | Sept. 13, 1949 |
| 2,528,972 | Pillemer | Nov. 7, 1950 |

OTHER REFERENCES

Annals of Internal Medicine, December 1948, page 1078.

Journal American Medical Association, October 9, 1948, page 426.

Annals of the New York Academy of Sciences, November 30, 1948, pages 183 and 280.

Hydrogen Ions—Britton—3d edition, volume 1 (1943), page 311.

Surgery, Gynecology and Obstetrics, June 1951, page 670.

Journal of Pharmacy and Pharmacology, volume IV, number 12, December 1952, pages 1009 to 1036, especially at pages 1033 and 1034.